Nov. 28, 1939.  C. LACHMAN  2,181,514
MEANS AND METHOD FOR THE PREPARATION OF GLACÉ FRUIT
Filed March 12, 1937  4 Sheets-Sheet 1

INVENTOR,
CHARLES LACHMAN
BY *Lippincott & Metcalf*
ATTORNEYS.

INVENTOR.
CHARLES LACHMAN
BY Lippincott & Metcalf
ATTORNEYS.

Nov. 28, 1939.    C. LACHMAN    2,181,514
MEANS AND METHOD FOR THE PREPARATION OF GLACÉ FRUIT
Filed March 12, 1937    4 Sheets-Sheet 3

INVENTOR.
CHARLES LACHMAN
BY Lippincott + Metcalf
ATTORNEYS.

Nov. 28, 1939.  C. LACHMAN  2,181,514
MEANS AND METHOD FOR THE PREPARATION OF GLACÉ FRUIT
Filed March 12, 1937  4 Sheets-Sheet 4
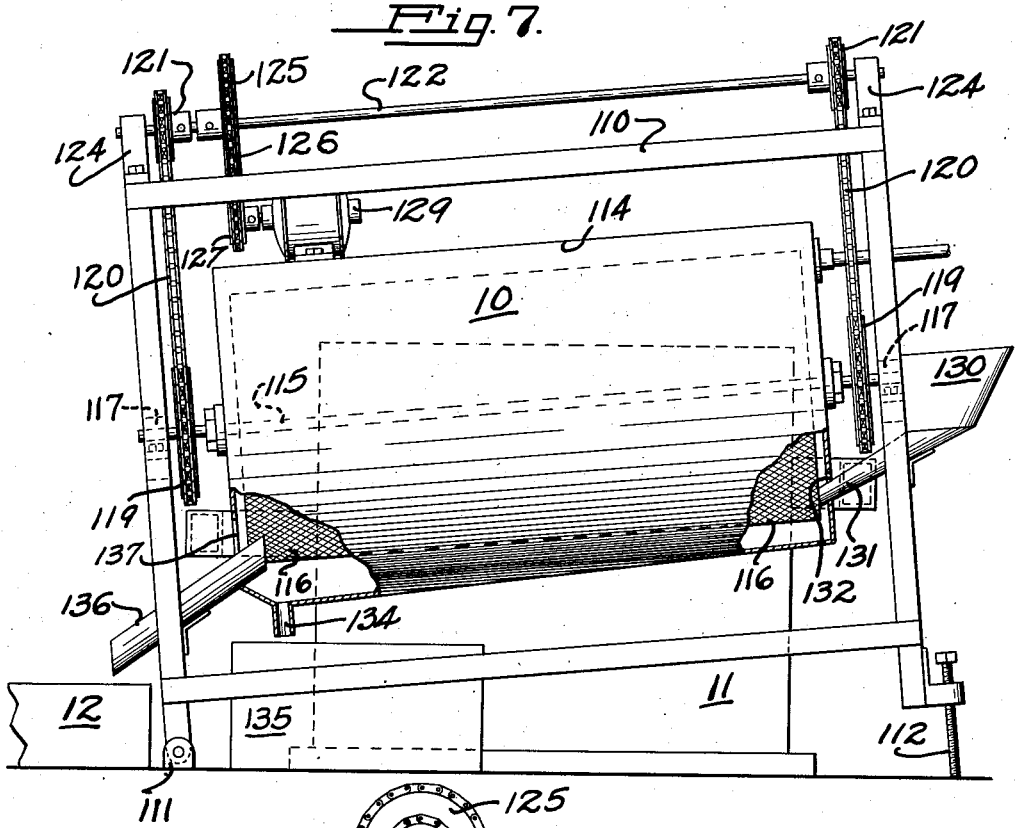
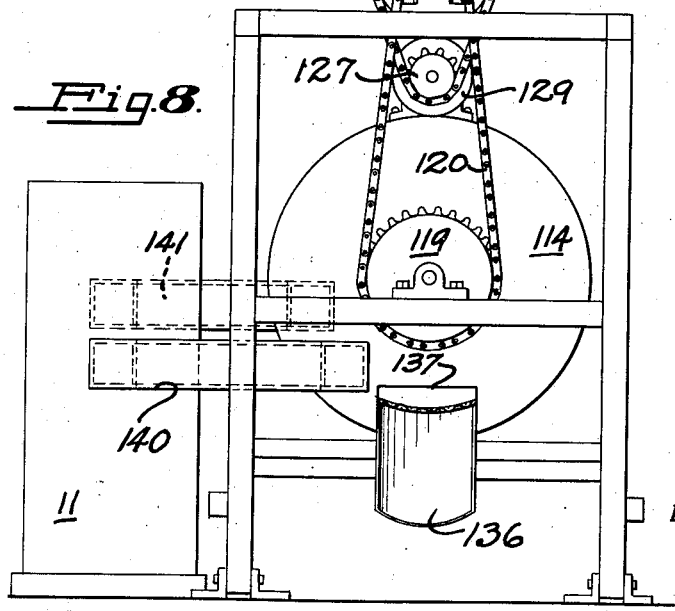
INVENTOR.
CHARLES LACHMAN.
BY Lippincott & Metcalf
ATTORNEYS.

Patented Nov. 28, 1939

2,181,514

UNITED STATES PATENT OFFICE 2,181,514

MEANS AND METHOD FOR THE PREPARATION OF GLACÉ FRUIT

Charles Lachman, San Francisco, Calif., assignor to S and W Fine Foods, Inc., San Francisco, Calif., a corporation of California Application March 12, 1937, Serial No. 130,522

5 Claims. (Cl. 99—239)

My invention relates to food processing and machinery therefor, and particularly to a method of producing glacé fruit.

Among the objects of my invention are: To provide mechanical means for "de-ragging citrus fruit shells; to provide a method of dicing citrus fruit shells and mechanically removing the inner skin therefrom; to provide a mechanical method of producing diced particles of citrus fruit skin which are free from the interior skin or "rag"; to provide semi-automatic means for producing glazed fruit; to provide a method for producing and treating glazed fruit of such a nature that the treated fruit may be preserved in hermetically sealed packages; and to provide a method of packaging glazed fruits in hermetically sealed containers without the use of a sugar syrup.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Briefly as to apparatus, my invention comprises a dicer of unique design combined with a de-ragger, apparatus for cooking and otherwise treating the material to be processed, and apparatus for preparing the treated fruit for canning. I have illustrated the component apparatus in the drawings, in which Figure 1 shows a schematic assemblage of the entire apparatus and the order of operation.

Figure 7 is a schematic view in partial section of apparatus for removing the syrup from the fruit prior to canning.

Figure 8 is a schematic end view of the same component.

My invention may be better understood by reference to the figures and details thereof.

The preparation of glacé fruits, sometimes called simply candied fruits, involves the impregnating of the fruit with a sugar solution. Cheaper and less satisfactory candying may be done by cooking the material for only a short time, and applying to the surface a coating of heavy syrup to produce a smooth, glazed surface.

The better product is obtained, however, by impregnating the entire fibre with a highly concentrated syrup, so that the fruit is fully "plumped out", and an even sugary texture is obtained throughout. This requires approximately ten days of repeated cooking and cooling, while constantly soaking in a syrup bath the density of which is gradually increased during the process.

The infiltration of sugar is accomplished more rapidly if the fruit is cut in small sections, or "diced", rather than cooked whole or in halves. It is usual practice to candy figs and cherries whole, to halve apricots, peaches and pears, to slice pineapple into conventional annular form, and to dice citron, lemon, grapefruit, orange and similar fruits, using only the "shell", or skin.

When the peel or skin only of citrus fruits is to be used, the inner skin or "rag" which encloses the fruit proper is removed. Ordinarily this is done by hand, and since the rag and peel are very adherent, the process is slow and expensive. It is a part of the present invention to provide means for mechanically dicing the shells and separating the rag from the peel, and in consequence to make possible profitable utilization of the half-orange skins or "shells" which are available in quantity after the extraction of juice for sale, canned or fresh. The details of the dicing and de-ragging mechanisms will be described below.

Figure 1:
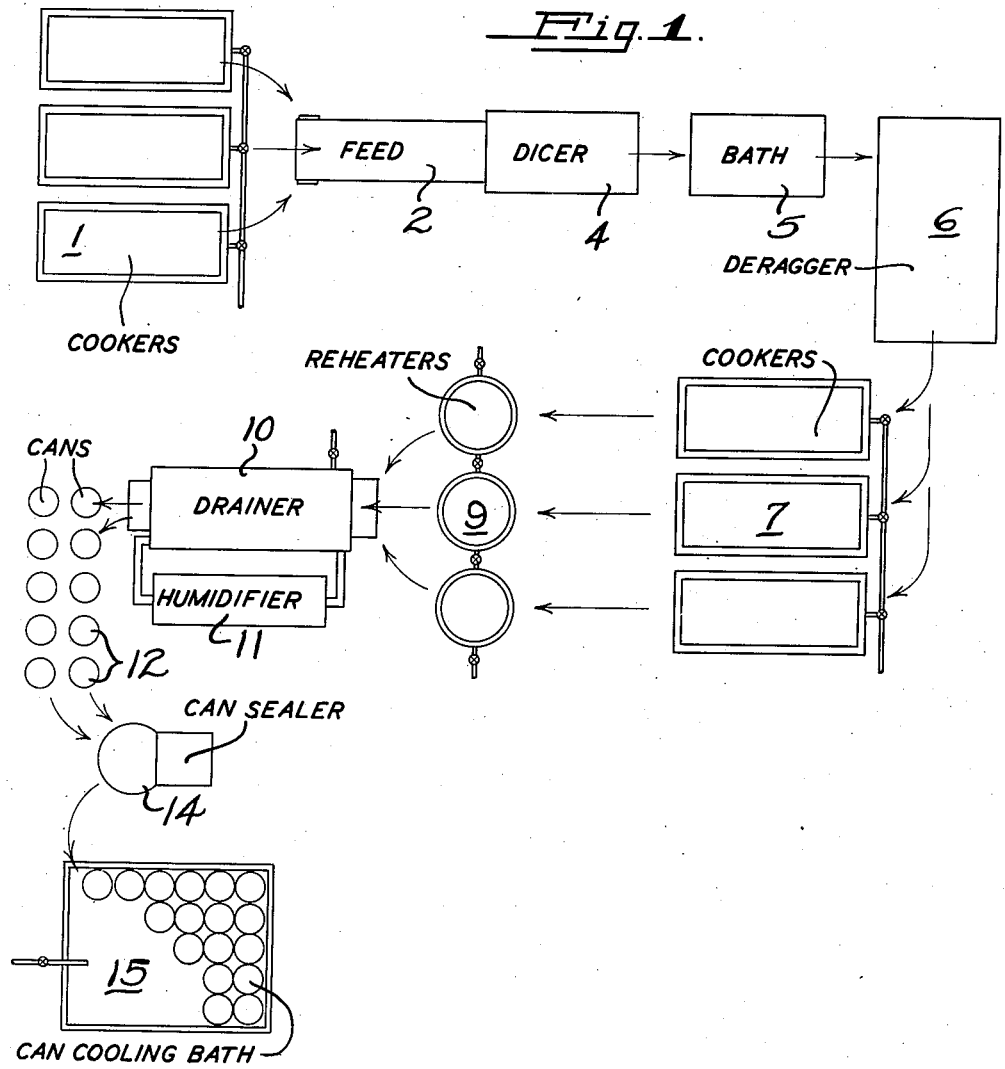

The preparation of citrus fruit shells from which the pulp has been removed begins, referring now to Figure 1 of the drawings, with a short period of boiling in plain water in cookers 1, which may be of any convenient form, after which they are placed on a feed belt 2 leading to the dicer 4 which will be described in detail hereafter. After dicing the cut peels are washed in a bath 5, and the inner skin is separated from the outer in the de-ragger 6, which also drains off the washing water.

The diced peel is then placed in cookers 7, which may conveniently be steam-jacketed copper vats or tubs, and in which is prepared a sugar syrup. A satisfactory initial concentration of syrup may be obtained by mixing sugar and water in the proportion of one cup of water to one pound of sugar for each pound of diced fruit to be added.

Live steam is then admitted to the jacket, and the mixture boiled vigorously for a short period, which may be from one quarter to one half hour. More rapid heating may be secured by passing steam through a series of pipes formed of copper or other non-corrosive metal, placed within the vat or cooker. For ease in cleaning, the pipes may be protected from direct contact with the fruit by a metal screen having apertures therethrough of sufficient size to permit free passage of the syrup, while restraining the fruit particles. The construction of these cookers is, however, conventional, and I may adopt any form of cooker which is available.

After a short period of boiling the mixture is allowed to cool, and this process is repeated at desired intervals over a period of ten days. Each cooking period causes the sugar syrup to become more dense, and the fruit gradually absorbs the sugar throughout its entire cross-section.

It may sometimes be desirable to produce a mixture of various types of fruits. In this case, other citrus fruit shells may be prepared in the same fashion and added in the cookers. Cherries, figs, pineapple and other desired components may be conventionally treated and added in proper proportion. The repeated cookings in the same syrup will then produce a pleasingly blended product which, after the fruit components have become sufficiently tender and are well "plumped" by absorption of the sugar, are ready for canning.

The mixture to be canned is brought to the proper temperature in re-heaters 9, which may be steam-jacketed preserving kettles of conventional design, and then passed into a drainer 10, to be described in detail later. While in the drainer the juice is removed, but the fruit is maintained in a moist condition by a humidifier 11 which operates in conjunction with heating apparatus to maintain the fruit at proper canning temperature.

The drained fruit is placed in cans 12, which are immediately sealed in a can sealer 14 of conventional type, the cans soldered and placed in a cooling bath 15, after which they are ready for labeling and use.

I believe that I am thus the first to provide a method of packing glacé fruits in hermetically sealed containers without drying and without a syrup. It has been necessary, in the previous state of the art, to dry the fruit in ovens or the open air, which renders it noticeably less succulent and tender, or if packed in sealed containers, to surround the fruit with a sugar syrup in order to prevent contamination or spoilage, and to make possible ease of handling commercially.

Figure 2:
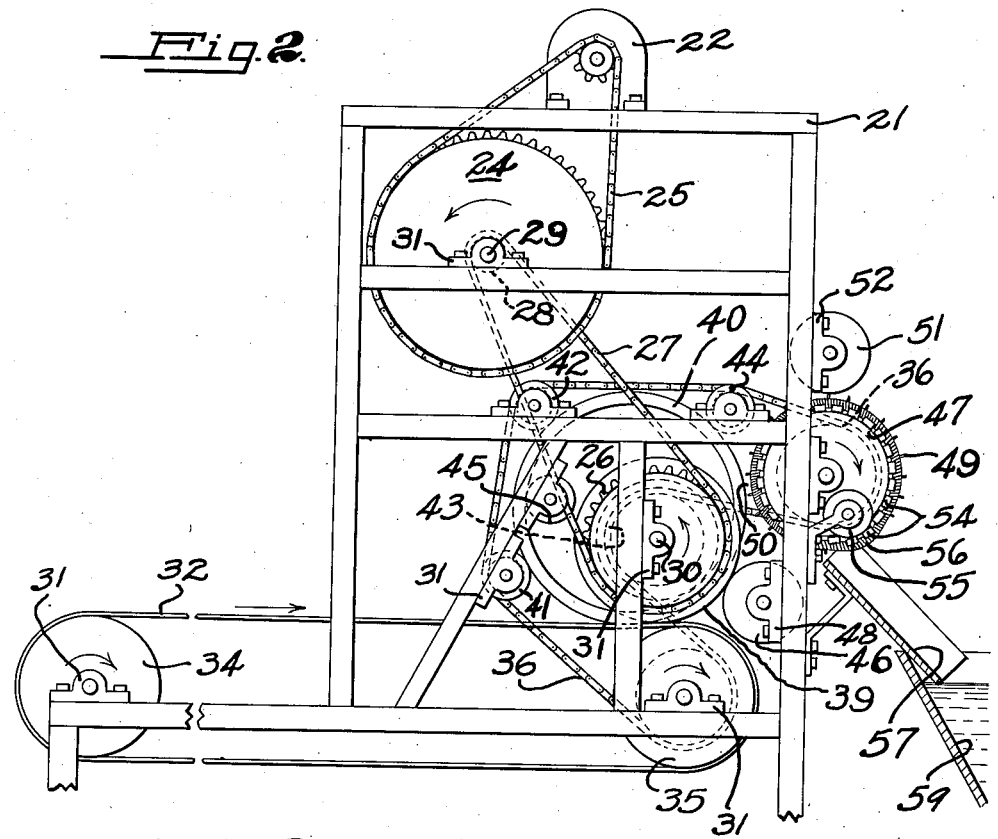
Figure 2 shows a side view of the dicer.
Figure 3:
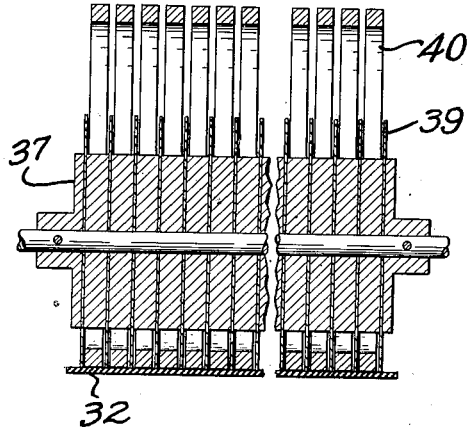
Figure 3 is a sectional view of a portion of the dicer.
Figure 4:
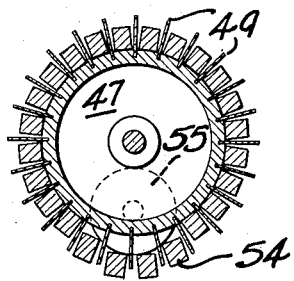
Figure 4 is a schematic sectional view of another portion of the dicer.

Having described the process as a whole, I wish to describe with greater particularity the construction of my dicer, which is illustrated in Figures 2, 3 and 4.

A frame 21 supports a motor 22 which drives the cutting elements through the medium of a reduction gear 24 and endless chain 25, and a second reduction gear 26 driven by an endless chain 27 from gear 28. These gears 24 and 26 are supported upon axles 29 and 30, respectively, which are journaled in conventional journal bearings 31 fixed to frame 21 in suitable position, and carry sprockets 28 and 43 fixed relative to said gears.

Citrus fruit shells to be diced are placed upon an endless conveyor belt 32 supported at either end by rolls 34 and 35 driven by an endless chain 36. The rolls 34 and 35 are rotatably carried by journals 31 fixed to the frame 21 in such position that the shells are carried under a cutting drum 37, which acts as a holder for circular cutting blades 39. These cutting blades perform a dual function, since they are evenly spaced along drum 37 transversely of the feed belt 32, with a separation sufficient to permit a plurality of eccentrically positioned rings 40 having a relatively large diameter to rotate freely thereabout, the blades acting as spacers between adjacent rings. Cutting drum 37 is so positioned that knives 39 clear the conveyor belt by a space of the order of one-eighth inch. Drum, knives and rings are detailed in Figure 3.

The axial position of the rings 40 is determined by four rollers, three of which, 41, 42 and 44, are positioned about the circumference of the ring assembly, the fourth, 45, being positioned inside the rings. These rollers extend across the ring assembly transversely, being rotatably supported in journals 31 fixed in proper position on frame 21.

Chain 36, which drives the feed belt 32, also passes over sprockets fixed to the external rollers 41, 42 and 44, and the friction of the rings 40, due to roller 45, against the rollers 41, 42 and 44, causes the rings to revolve. The rings are so positioned that a separation of a very small amount exists between them and the belt, and the direction and speed of travel are the same for belt and rings at their adjacent points. Chain 36 engages, and is actuated by, sprocket 43, which in turn is driven by gear 26. Hence the movements of belt 32 and the rings 40 are in synchronism.

In consequence, the shells which have been placed on the conveyor belt are drawn between the belt and the rings, and are flattened out so that shells are partially pressed into the spaces between adjacent rings. The pressure is sufficient to force the knives 39 into the surface of the peel, and the friction is sufficient to cause the shells to adhere to the rings and knives and leave the conveyor belt as they emerge from the contact area.

The eccentricity between knives and rings is such that the blades project beyond the rings opposite a resilient rubber roller 46 rotatably mounted in journals 48 attached to frame 21, and engage therewith with sufficient pressure to completely separate the strips of peel. The separated strips are held by friction between adjacent rings, and carried an additional distance around the ring circumference to contact a transverse drum 47 from which project knives 49 which penetrate the peel strips at a point 50 with sufficient force to cause the strips to adhere thereto and be transferred to drum 47, which is rotated by the same chain 36 which drives the rings 40.

A second resilient roller 51, similar to roller 46, is positioned in journals 52 to engage knives 49 with sufficient pressure to cut each strip into a number of diced sections. The separation need not be entirely complete at this point between adjacent diced particles, but must be nearly so.

Friction between the diced particles and the knife blades 49 which have produced the transverse cuts across the strips received from the circular knives 39 causes the particles to remain fixed on drum 47 until forcibly removed therefrom.

For this purpose, a plurality of ejector bars 54, formed of non-corrosive metal, is provided. Each of said bars, as may be seen from Figures 2 and 4, is of rectangular cross-section, and longer than drum 47. One of said bars is disposed between each adjacent pair of blades 49, extending equally beyond each end thereof. Each bar is of such size as to fit loosely between blades 49 at the surface of drum 47, and yet be able to force out any matter clinging to said knives if said bar is moved radially outward.

Endless coil springs 56 are disposed about the ends of bars 54 protruding beyond drum 47, holding said bars resiliently in position against the drum, permitting radial movement of each bar, and restoring the bars to their initial position after such radial movement.

The diced particles are permitted to adhere to the blades while drum 47 rotates about 150° past the point of contact with roller 51. At this point, two rollers 55, rotatably supported by frame 21, one at each end of and eccentric to drum 47, engage bars 54, forcing each in succession radially outward, whereby the diced peel is forced from the blades 49, falling upon an inclined delivery chute 57, and thence into a wash trough 59 which forms a part of the washing and de-ragging device to be next described.

Figure 5:
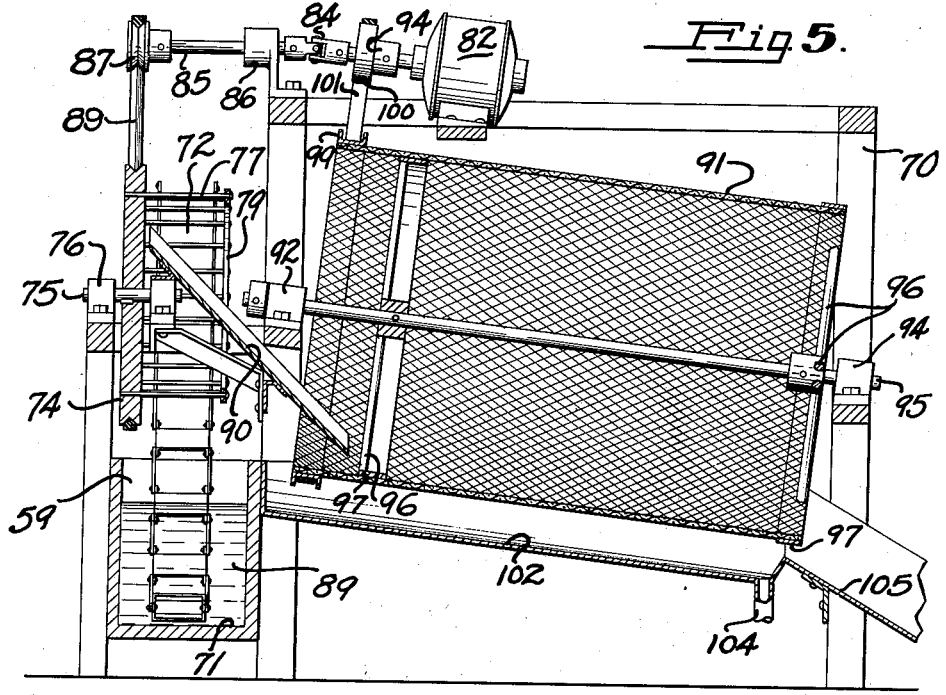
Figure 5 is a schematic view, partially in section, of the de-ragger.
Figure 6:
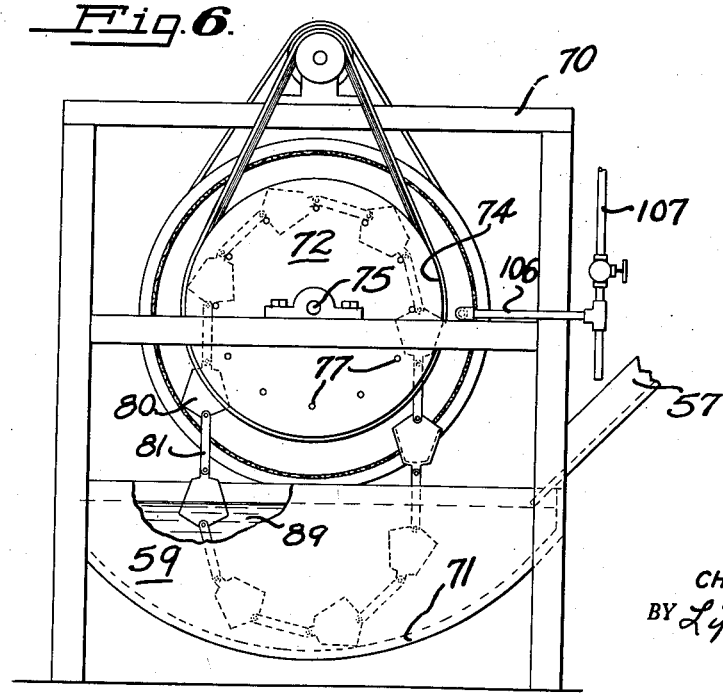
Figure 6 is an end view of the de-ragger, showing the feeding mechanism therefor.

Figure 5 shows a side view, partially in section, of the washer and de-ragger, while Figure 6 shows a view of the combination from the intake end.

A frame 70 supports at one end thereof a washing trough 59, which has parallel sides disposed roughly in continuation of the delivery chute 57, down which the diced segments of peel travel by gravity. The bottom 71 of trough 59 is of roughly semi-circular section in the plane of its sides.

A squirrel cage drum 72 is rotatably supported upon frame 70 directly above the trough 59. Drum 72 is formed upon a peripherally grooved circular element 74 keyed to a central shaft 75 revolving freely in bearings 76. A plurality of rods 77 are fixed in circular element 74 parallel to shaft 75 and evenly spaced concentrically thereabout. An annular plate 79 is fixed to the rod ends not held in element 74, thus forming a rigid skeleton drum similar in form to the rotor of a squirrel cage motor.

An endless conveyor is disposed over the squirrel cage 72, of such length as to hang to the bottom of wash trough 59. The conveyor is formed of a plurality of buckets 80 pivotally linked by side straps 81.

In operation, a motor 82, positioned on frame 70, drives the squirrel cage 72 through the medium of a universal joint 84, a shaft 85 rotatably supported parallel to shaft 75 by a journal bearing 86, a shaft pulley 87, and a belt 89 which passes around pulley 87 and the peripherally grooved element 74 which supports the cage.

Trough 59 is filled with washing water 89, into which the diced particles are directed by chute 57. Buckets 80 scoop up the particles as the motor 82 drives the squirrel cage, and elevate them to the top of the cage, where they are discharged as the buckets turn over.

An inclined chute 90 is supported on the frame 70 in position to receive the diced fruit discharged from the buckets and direct it into the de-ragging drum 91.

Journal bearings 92 and 94 are positioned upon frame 70 in such fashion as to support a shaft 95 at an angle to the horizontal. Upon shaft 95 are disposed cross arms 96 terminally fixed to circular supporting hoops 97. About hoops 97 is stretched an open mesh metal fabric forming drum 91, around the superior end of which is disposed a belt guide 99.

Motor 82 is so positioned upon the frame that a shaft pulley 94, disposed between the coupling 84 and said motor, is axially parallel to shaft 95, and alined with the belt guide 99 which is concentrically disposed about said shaft 95. A belt 101 running over pulley 100 and belt guide 99 permits motor 82 to drive drum 91.

A shield 102 is formed concentrically about the lower portion of drum 91, and a drain pipe 104 is provided at the bottom of said shield. Discharge chute 105 is fixed on frame 70 in registry with the inferior end of drum 91. A pipe 106 supplies water to the interior of drum 91 from a main supply 107.

The washed peel directed by chute 90 into the de-ragging drum 91 is not entirely separated into the diced squares, a number of portions clinging to each other, largely by virtue of the interior skin or rag. The constant rotation of drum 91 provides sufficient mechanical agitation and friction of and between the particles to tear the rag from the shell. The mesh of drum 91 is so chosen that the rag particles, together with the residual washing water from trough 59 and that additionally supplied as a lubricant by pipe 106, drain into shield 102 and are carried away by pipe 104, while the now completely separated and de-ragged peel particles are discharged by gravity from the inferior end of the drum down the discharge chute 105.

The amount of agitation required to completely de-rag the shells is easily learned by experience. The length of time to travel through the drum, and hence the amount of agitation, is controlled by the pitch of the shaft 95 and the speed of rotation, and it is merely a matter of mechanical expediency to properly coordinate them.

The diced peel is now ready for cooking in sugar syrup in the cookers 7, as described previously; after it is sufficiently candied, together with such other fruits as it is desired to mix therewith, the mixture is boiled in reheaters 9 and finally prepared for canning in the strainer and humidifier 10 and 11, which will now be described in detail.

The consistency of the syrup used, its close adherence to the candied material, and the necessity of keeping the material hot to ensure the success of the canning operation requires special treating means. It is preferable to agitate the material thoroughly while draining to remove the maximum quantity of syrup, the material must be kept hot at the same time, and the humidity must be such as to prevent drying out of the material under continuous heat. Consequently, the heating, draining and humidifying apparatus must function as a unit.

The straining apparatus 10, illustrated in detail in Figures 7 and 8, is supported on a frame 110 adjustable in reference to the horizontal. The adjusting means have been conventionally indicated as a pivotal frame support 111 at one end of said frame, and an adjustable screw 112 at the opposite end of said frame.

A closed cylindrical chamber 114 is supported on frame 110. Eccentrically disposed therein upon a shaft 115 is a cylindrical open mesh drum 116. The ends of shaft 115 project through the ends of chamber 114, and are rotatably journaled in bearings 117 fixed to frame 110. Driven gears 119 are keyed to each projecting end of shaft 115. Endless chains 120 are disposed about gears 119 and about driving gears 121 alined therewith and keyed to an overhead intermediate driving shaft 122 rotatably journaled in bearings 124 fixed on top of frame 110. A driving gear 125, keyed to said shaft 122, is driven by a chain 126 from a driving pinion 127 attached to a suitably positioned motor 129.

Fruit to be canned is poured from the reheaters into a hopper 130 and chute 131 which leads through an intake port 132 in the superior end of chamber 114 into drum 116. As the drum 116 is rotated by motor 129, the juice is strained off and collects in the bottom of the closed chamber 114, from which it may be removed through a drain tube 134 into any suitable receptacle, for subsequent use or other disposal.

The strained candied matter travels by gravity along the drum, finally dropping down a discharge chute 136 through an outlet port 137 into cans or other suitable containers 12. During passage along the drum, moist hot air continually surrounds the candied material. Humidifier 11 is a hot air heater having pipes 140 and 141 through which air may continually pass into and out of chamber 114. Means, not shown in the figures, are provided for injecting a suitable amount of water vapor into the air passing into the strainer.

When a suitable amount of candied fruit has been weighed into the cans, they are capped, sealed, cooled, and may then be distributed to the trade. The sealer 14 and cooling bath 15 are purely conventional, and the details thereof form no part of the present invention.

Summarizing, my invention provides both a process and a mechanism for treating glacé fruit; makes possible mechanical dicing and de-ragging of citrus fruit shells, which has hitherto been impractical; permits canning, without syrup, of candied fruits which are succulent and tender; and is particularly adapted to preparing packaged fruit in units of thirty-five pounds or over, perfectly preserved without weight-adding and space-consuming syrup components.

I claim:

1. Apparatus for processing citrus fruit peel and the like comprising in combination means for partially dicing the peel by cuts inwardly directed therethrough which do not sever the inner rag, means for agitating the cut peel to separate the diced portions from said rag, means for supplying a washing liquid during said agitating process, and means for straining said peel from said liquid and rag.

2. Apparatus for processing citrus fruit peel and the like comprising in combination means for partially dicing the peel by cuts inwardly directed therethrough which do not sever the inner rag, means for mixing the partially diced peel with a liquid, a rotary strainer drum, means for conveying said peel and liquid into said drum to remove the diced portions from said rag by agitation thereof, means for discharging the diced portions, and separate means for discharging the separated rag and liquid.

3. Apparatus for processing citrus fruit peel and the like comprising in combination means for partially dicing the peel by cuts inwardly directed therethrough which do not sever the inner rag, means for mixing the partially diced peel with a liquid, an agitator comprising a rotatably mounted strainer drum having an inclined axis and means for rotating said drum, a conveyor mounted to supply the mixed peel and liquid to the upper end of the drum, a discharge for the de-ragged peel at the lower end of the drum, and means below the drum for collecting and discharging said liquid and the removed rag.

4. The method of de-ragging citrus fruit peel or the like which comprises the steps of cutting through the outer layer of the peel, leaving portions thereof attached to the inner peel or rag, agitating the partially cut peel to break the cut portions from the rag, and then straining off the rag.

5. The method of de-ragging citrus fruit peel or the like which comprises the steps of cutting through the outer layer of the peel, leaving portions thereof attached to the inner peel or rag, mixing the partially cut peel with a liquid, agitating the peel and liquid to break off the cut portions from the rag, and straining off the rag with the liquid.

CHARLES LACHMAN.